July 11, 1967 D. J. MURPHY, JR 3,330,101

PARTICULATE-TYPE FLUID-TREATING FILTER ASSEMBLY

Filed March 30, 1966

INVENTOR.
DAVID J. MURPHY, JR.

BY

*Ralph P. Brick*

ATTORNEY

United States Patent Office 3,330,101
Patented July 11, 1967

3,330,101
PARTICULATE-TYPE FLUID-TREATING FILTER ASSEMBLY
David J. Murphy, Jr., Louisville, Ky., assignor to American Air Filter Company, Inc., Louisville, Ky., a corporation of Delaware
Filed Mar. 30, 1966, Ser. No. 538,699
7 Claims. (Cl. 55—484)

The present invention relates to fluid filters, and more particularly, to a novel structural arrangement for a unit fluid-treating filter assembly of the particulate type.

In accordance with the present invention, a unit filter construction of the particulate type is provided which is of such nature as to insure uniform distribution of particulate material with optimum exposure to the fluid stream to be treated and with minimum packing and attrition of such material. In addition, the present invention provides a fluid-treating filter assembly construction of sufficient strength and stability to withstand intensive shock loads to which such type filter assembly might be subjected. Further, the present invention, provides a unit filter arrangement which is economical in construction, assembly, operation, and maintenance, lending itself to ready mass assembly and interchange of parts.

Various other features of the present invention will become obvious to one skilled in the art upon reading the disclosure set forth hereinafter.

More particularly, the present invention provides a fluid-treating filter apparatus comprising: a flow-through housing defining a gas treating plenum; a first cover plate member disposed across one end of the housing, the cover plate member having spaced rows of spaced apertures disposed therein in preselected geometric configuration; a set of perforated fluid conduits disposed within the housing in communication with the apertures to provide spaced rows of spaced conduits longitudinally extending in parallel relationship along the direction of fluid flow through the housing; spaced pairs of longitudinally-extending perforated plate members disposed within the housing with the plates of each pair being spaced from and on opposite sides of a row of spaced conduits to define chambers surrounding the rows of spaced conduits; spacer means to maintain the pairs of longitudinally-extending perforated plate members in spaced relationship; particulate filter means disposed in the chambers surrounding the rows of spaced conduits; and a second cover plate means disposed across the other end of the housing to selectively cover the ends of the conduits and the ends of the chambers surrounding the conduits without covering the spaces between pairs of perforated plates adjacent such ends to permit gas to be treated to flow in a path extending from one end of the housing to the other in a course including the apertures of the cover plate of one end, the perforated fluid conduits, the particulate filled chambers, and the uncovered spaces at the other end between pairs of perforated plates.

It is to be understood that various changes can be made in the arrangement, form and construction of the apparatus disclosed herein without departing from the scope or spirit of the present invention.

Referring to the drawing.

Figure 1:
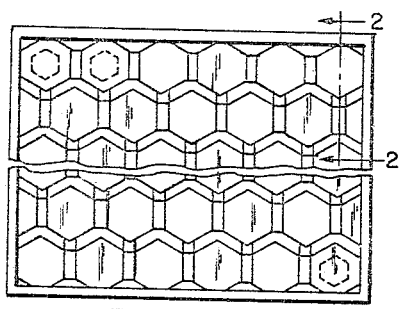
FIGURE 1 is a broken end view of one end of the unit filter assembly incorporating the novel features of the present invention.
Figure 2:
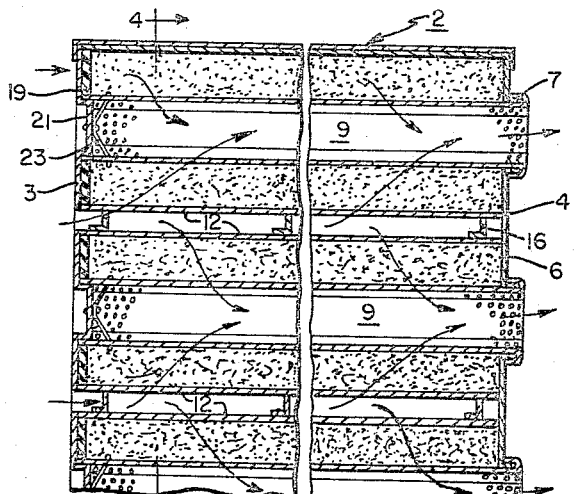
FIGURE 2 is an enlarged vertical sectional view of a portion of the filter apparatus of FIGURE 1 taken in a plane passing through line 2—2 of FIGURE 1.
Figure 6:
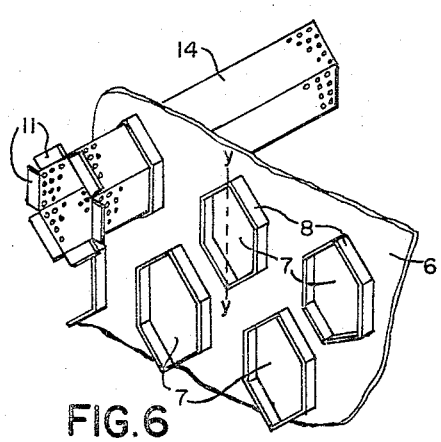

As can be seen from the drawing, the novel filter assembly includes filter housing 2 having dirty gas inlet 3 and clean gas outlet 4. Housing 2, which serves to define a gas-treating plenum, can be made from any one of a number of suitable materials known in the art, and advantageously, a lightweight, thin gauge aluminum or wood material can be utilized. Disposed across one end of housing 2 (FIGURES 2 and 6) is cover plate member 6. Cover plate member 6 is provided with a plurality of spaced apertures 7, which in the disclosed embodiment of the invention are arranged in the cover plate in spaced rows extending across the breadth of the cover plate. Advantageously, apertures 7 can be of six-sided shape and are so disposed in the plate that the spaced apertures in one row are offset with respect to the spaced apertures of the immediately adjacent row (FIGURE 6) with each aperture having a pair of opposite corners in vertical alignment on plate 6 (as illustrated by broken line y—y of FIGURE 6). It is to be noted that sealing flange members 8 are provided on cover plate member 6, such sealing flange members 8 surrounding and extending from the periphery of apertures 7 along the outer face of the cover plate member. It is to be understood that cover plate member 6 like housing 2 can be fabricated from any one of a number of suitable thin sheet metals such as stainless steel or aluminum, and it further is to be understood that apertures 7 and sealing flanges 8 can be formed as an integral part of the cover plate member.

Disposed within housing 2 is a set of perforated conduits 9 which can be made from any one of the materials aforementioned suitable for housing 2 and cover plate member 6. Conduits 9 can be of six-sided cross-sectional configuration, conforming with the configuration of apertures 7 and are sized so that corresponding ends thereof can be inserted through the apertures 7 with the body portions of the conduits extending within housing 2 in longitudinal parallel relationship along the direction of flow through the housing. It will be noted that the end of each conduit 9 which extends through apertures 7 is provided with a set of overlap flanges 11. Flanges 11 are adapted to be folded back during assembly operations to nestingly engage sealing flanges 8 between such flanges and the body portions of the conduits to hold the conduit ends in fast sealing engagement with the cover plate member 6.

Also disposed within housing 2 in spaced, substantially parallel longitudinally-extending relationship are spaced pairs of perforated plate members 12. Plate members 12 are of corrugated cross section to include flats 10 and peaks 15 and can be formed from a suitable thin sheet metal material such as that suitable for housing 2, conduits 9 and end cover plate member 6. The plates 12 of each pair are arranged in spaced mirror-image relationship on opposite sides of a row of spaced conduits 9. It is to be noted that the cross-sectional corrugated contour of plates 12 of each pair, the mirror-image positioning of the plates in each pair and the staggered or offset positioning of adjacent plate pairs is such as to aid in defining chambers 13 which surround conduits 9 to provide rows of such chambers of six-sided cross-sectional configuration with the chambers 13 of adjacent rows being in staggered or offset relationship. To complete the boundaries of chamber 13, a second set of spaced, perforated conduit members 14 of rectangular cross-sectional configuration are provided. Conduits 14 are disposed within housing 2 in longitudinally-extending, parallel relationship to form spaced rows in alternate relationship with conduits 9. The conduits 14 are of such cross-sectional breadth that the opposite longitudinally-extending sides thereof engage against the flats of oppositely disposed perforated plates 12 of a plate pair to hold the plates of such pair in spaced relationship from each other. To hold the pairs of spaced plates 12 in spaced relationship from each other, spacer tabs 16 are provided. Tabs 16 can be in the form of right-angle leg members having one leg fastened to a corrugated flat on plate 12 of one plate pair, and the other leg notched, as at 17, to receive a crest of plate 12 of an adjacent plate pair. It is to be understood that the size and number of rows of conduits and plates aforedescribed will be determined by the size of housing 2. It further is to be understood that the plates and end conduits such as at 18 can be trimmed and shaped for compact fitting within housing 2.

To accomplish the desired gas treating effect, the six-sided chambers 13 formed between perforated conduits 9 and plates 12 can be filled with any one of a number of suitable particulate filter materials, and advantageously, a suitable activated carbon particulate material has been found satisfactory.

Figure 3:
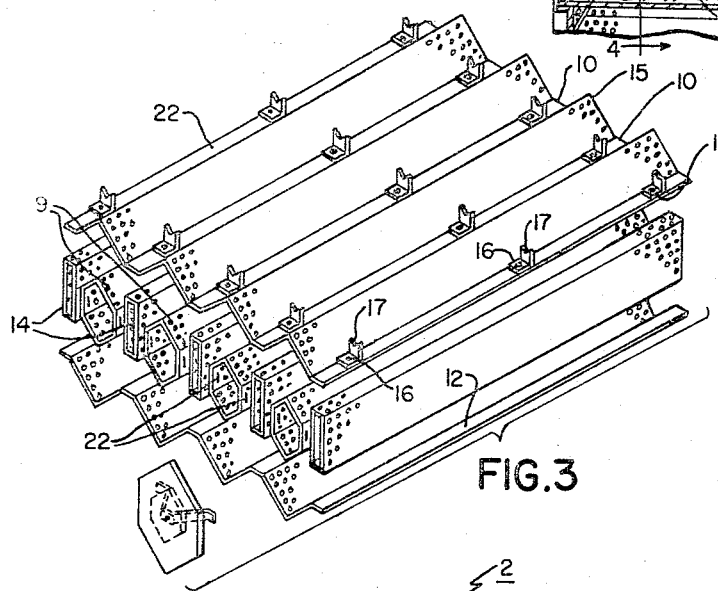
FIGURE 3 is an exploded, isometric view disclosing a portion of the novel unit filter assembly, particularly the novel manner in which the flow-through chambers are constructed within the unit filter assembly housing.
Figure 5:
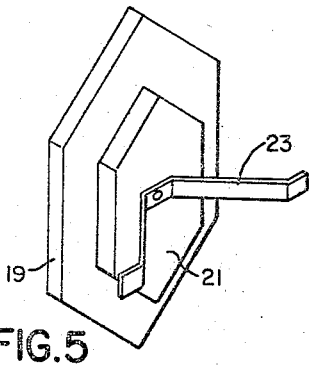
FIGURE 5 is an enlarged isometric view of one cover plate member utilized at one end of the unit filter assembly; and, FIGURE 6 is an isometric view of a portion of the filter housing of FIGURES 1 to 5, disclosing the novel arrangement in which the perforated conduit members are fastened in sealed relationship with the apertures of an apertured end cover plate.
Figure 4:
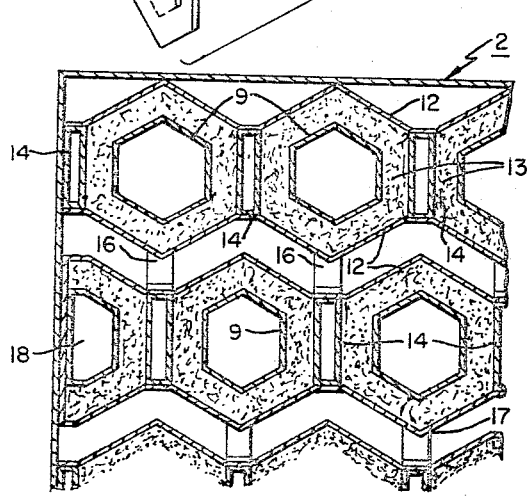
FIGURE 4 is a partial cross-sectional view of the filter apparatus of FIGURES 1 to 3 taken in a plane passing through line 4—4 of FIGURE 2.

Disposed across the end of housing 2 opposite the end having cover plate member 6 are a plurality of six-sided cover plate members 19. Each cover plate member 19 (FIGURE 5) is sized and shaped to cover an end of a perforated conduit 9 and the end of a chamber 13 surrounding such conduit. Cover plate members 19 are each provided with a six-sided offset shoulder 21 which can be in the form of a block integral therewith to extend therefrom. Offset shoulder member 21 is sized and shaped to nestingly engage in an end of conduit 9. As can be seen in FIGURE 3 of the drawing, one end of each conduit 9 is provided with a pair of oppositely disposed locking slots 22 which are located in opposite side walls of the conduits adjacent the offset shoulder-receiving ends. A resilient lock arm 23 is mounted on the offset shoulder portion 21 of the cover plate 19 to extend from such offset shoulder portion for engagement with slots 22 of the conduit and thus hold the cover plate member in fast relationship in the end of the conduit.

With the arrangement aforedescribed, a flow-through course through housing 2 is provided which includes apertures 7 of cover plate member 6 at one end thereof, the perforated fluid conduits 9, the particulate filter chambers 13, and the uncovered spaces between the pairs of perforated plates provided by spacer tabs 16. Thus, a unit filter construction of the particulate type is provided which includes a plurality of flow-through particulate chambers within the unit of such nature as to insure uniform distribution of the particulate material with optimum exposure to the fluid stream to be treated and a minimum of particulate material packing and attrition.

The invention claimed is:

1. A fluid-treating filter apparatus comprising: a flow-through housing having opposing side walls and defining a gas treating plenum; a first cover plate member disposed across one end of said housing, said cover plate member having spaced rows of spaced apertures disposed therein of preselected geometric configuration; a set of perforated fluid conduits disposed within said housing in communication with said apertures to provide spaced rows of spaced conduits longitudinally extending in parallel relationship along the direction of fluid flow through said housing; spaced pairs of longitudinally-extending perforated plate members disposed within said housing with the plates of each pair being spaced from and on opposite sides of a row of spaced conduits to define chambers surrounding said rows of spaced conduits; said spaced pairs of plate members extending substantially continuously from one of said opposing side walls to the other said opposing side wall; spacer means to maintain said pair of longitudinally-extending perforated plate members in spaced relationship; particulate filter means disposed in and substantially filling said chambers surrounding said rows of spaced conduits; and a second cover plate means disposed across the other end of said housing to selectively cover the ends of said conduits and said chambers surrounding said conduits adjacent such ends without covering the spaces between pairs of perforated plates adjacent such end to permit gas to be treated to flow in a path extending from one end of said housing to the other in a course including said apertures of said cover plate at one end, said perforated fluid conduits, said substantially particulate filled chambers and said uncovered spaces at the other end between pairs of perforated plates.

2. The apparatus of claim 1, said spacer means including a second set of spaced, perforated conduits disposed in the same spaced rows and in alternate relationship with said first set of conduits with the opposite sides thereof engaging against the opposite plates of a pair of said perforated plates to hold said plates of a pair in spaced relationship, one end of each conduit of said second set of conduits being closed by said cover plate member at one end of said housing and the other end of said conduit of said second set being uncovered.

3. The apparatus of claim 1, said spacer means including spacer tabs disposed between said pairs of perforated plates to hold said pairs of plates in spaced relationship.

4. The apparatus of claim 1, said spaced apertures of said first cover plate means for said housing having sealing flange members surrounding and extending from the periphery thereof and said first set of fluid conduits each having overlap flanges at one end thereof to nestingly engage said sealing flange members on said cover plate to hold said ends in fast sealing engagement with said plate means.

5. The apparatus of claim 1, said second cover plate means including an offset shoulder means integral therewith and extending therefrom, said offset shoulder means having a peripheral configuration adapted to nestingly engage in the ends of said first set of conduits; lock arm means extending laterally from said offset shoulder means; and a pair of oppositely disposed locking slots in opposite walls of said first set of conduits adjacent the offset shoulder receiving ends thereof to receive said lock arm means in fast engagement therewith.

6. The apparatus of claim 1, said first set of perforated conduits having a six-sided cross-sectional configuration; said spaced pairs of longitudinally-extending perforated plates being so contoured that the defined chambers surrounding said first set of conduits have a six-sided cross-sectional configuration.

7. A fluid-treating filter apparatus comprising: a flow-through housing defining a gas-treating plenum; a first cover plate member disposed across one end of said housing, said cover plate member having spaced rows of spaced, six-sided apertures disposed therein with sealing flange members surrounding and extending from the periphery of said apertures; a set of six-sided perforated fluid conduits disposed within said housing to provide spaced rows of spaced conduits longitudinally-extending in parallel relationship along the direction of fluid flow through said housing, one end of each of said conduits having overlap flanges extending therefrom and adapted to nestingly engage said sealing flange members surrounding said apertures to hold said conduit ends in fast sealing engagement with said first cover plate member; spaced pairs of longitudinally-extending perforated plate members disposed within said housing with the plates of each pair being spaced from and on opposite sides of a row of spaced conduits, said plates of each pair being in mirror-image relationship and having a preselected cross-sectional corrugated contour to include peaks and flats so as to define chambers surrounding said first set of conduits of substantially six-sided cross-sectional configuration; a second set of spaced perforated conduits of rectangular cross-sectional configuration disposed in spaced rows in alternate relationship with said first set of conduits with the opposite longitudinally-extending sides thereof engaging against the flats of opposite plates of said perforated plate pairs to hold said plates of a pair in spaced relationship; notched spacer tabs disposed between said pairs of perforated plates to receive and hold opposed peaks and flats of said pairs of plates in spaced relationship; particulate carbon filter means disposed in said chambers surrounding said first rows of spaced conduits; and a plurality of six-sided cover plate members disposed across the other end of said housing, each of said cover plate members being sized and shaped to cover the ends of said first set of conduits and said chambers surrounding such conduits; said cover plate members each having a six-sided offset shoulder integral therewith and extending therefrom sized and shaped to nest in the ends of said first conduits; said ends of said first conduits each having a pair of oppositely disposed locking slots in opposite side walls thereof adjacent the offset shoulder-receiving end; and resilient lock arms mounted on and extending from said offset shoulder of each cover plate member to engage with said slots and hold said plate in fast relationship.

References Cited

UNITED STATES PATENTS

| | | | |
|---|---|---|---|
| 994,282 | 6/1911 | Spilsbury | 55—484 X |
| 1,982,099 | 11/1934 | Hechenbleikner | 55—484 X |
| 2,658,583 | 11/1953 | Fitzgerald | 55—518 |
| 2,758,671 | 8/1956 | Silverman et al. | 55—484 X |
| 3,076,302 | 2/1963 | Shoemaker | 55—521 X |
| 3,124,440 | 3/1964 | Hogg | 55—484 |
| 3,186,149 | 6/1965 | Ayers | 55—484 X |

FOREIGN PATENTS

| | | |
|---|---|---|
| 493,600 | 5/1919 | France. |
| 812,635 | 2/1936 | France. |
| 888,585 | 9/1943 | France. |
| 585,935 | 10/1933 | Germany. |
| 676,803 | 6/1939 | Germany. |
| 489,272 | 1/1954 | Italy. |

HARRY B. THORNTON, *Primary Examiner.*

D. TALBERT, *Assistant Examiner.*